(12) United States Patent
Kim et al.

(10) Patent No.: US 8,369,625 B2
(45) Date of Patent: Feb. 5, 2013

(54) METHOD FOR GROUPING 3D MODELS TO CLASSIFY CONSTITUTION

(75) Inventors: Keun Ho Kim, Daejeon (KR); Jun-Hyeong Do, Daejeon (KR); Jong Yeol Kim, Daejeon (KR)

(73) Assignee: Korea Institute of Oriental Medicine, Daejeon (KR)

( * ) Notice: Subject to any disclaimer, the term of this patent is extended or adjusted under 35 U.S.C. 154(b) by 274 days.

(21) Appl. No.: 13/001,942

(22) PCT Filed: Sep. 19, 2008

(86) PCT No.: PCT/KR2008/005542
§ 371 (c)(1), (2), (4) Date: Dec. 29, 2010

(87) PCT Pub. No.: WO2010/002070
PCT Pub. Date: Jan. 7, 2010

(65) Prior Publication Data
US 2011/0116707 A1    May 19, 2011

(30) Foreign Application Priority Data

Jun. 30, 2008  (KR) ......................... 10-2008-0062832
Jun. 30, 2008  (KR) ......................... 10-2008-0062833
Jun. 30, 2008  (KR) ......................... 10-2008-0062834

(51) Int. Cl.
G06K 9/00 (2006.01)
G06K 9/46 (2006.01)
G06T 15/00 (2011.01)

(52) U.S. Cl. ........ 382/224; 382/154; 382/167; 382/190; 345/420; 348/E7.08

(58) Field of Classification Search .................. 382/118, 382/100, 154, 276, 293, 294, 285, 165, 168, 382/167, 190; 345/419, 506, 420, 620, 522, 345/427; 378/42; 712/7, E9.071, E9.018; 606/130; 715/964; 703/1; 340/146.2; 700/182; 348/E7.08
See application file for complete search history.

(56) References Cited

U.S. PATENT DOCUMENTS 6,246,468 B1 * 6/2001 Dimsdale ..................... 356/4.02
6,377,625 B1 4/2002 Kim
(Continued)

FOREIGN PATENT DOCUMENTS

JP  2002-010283 A  1/2002
JP  2003-209849 A  7/2003
(Continued)

*Primary Examiner* — Sheela Chawan
(74) *Attorney, Agent, or Firm* — Lucas & Mercanti, LLP

(57) ABSTRACT

Provided is a three-dimensional model classification method of classifying constitutions. The method includes correcting color values of a frontal image and one or more profile images to allow a color value of a reference color table in the images to equal a predetermined reference color value, through obtaining the frontal image and one or more profile images of a subject including the reference color table by a camera, the reference color table including one or more sub color regions, generating a three-dimensional geometric model of the subject by extracting feature point information from the frontal image and the profile image, matching the corresponding feature point information to extract spatial depth information, after removing the reference color table region from the frontal image and the profile image, and classifying a group of the three-dimensional geometric model of the subject by selecting a reference three-dimensional geometric model having a smallest sum of spatial displacements from the three-dimensional geometric model of the subject from a plurality of reference three-dimensional geometric models stored in the database and setting the group which the selected reference three-dimensional geometric model represents as the group where the three-dimensional geometric model of the subject belongs.

20 Claims, 18 Drawing Sheets

U.S. PATENT DOCUMENTS

| | | | |
|---|---|---|---|
| 6,563,950 B1 * | 5/2003 | Wiskott et al. | 382/209 |
| 7,065,232 B2 * | 6/2006 | Geng | 382/115 |
| 7,330,584 B2 * | 2/2008 | Weiguo et al. | 382/154 |
| 7,808,503 B2 * | 10/2010 | Duluk et al. | 345/506 |
| 7,826,643 B2 * | 11/2010 | Geng | 382/115 |
| 7,892,169 B2 * | 2/2011 | Gono et al. | 600/178 |
| 2006/0140453 A1 | 6/2006 | Geng | |
| 2007/0297560 A1 | 12/2007 | Song et al. | |

FOREIGN PATENT DOCUMENTS

| | | |
|---|---|---|
| JP | 2007-278710 A | 10/2007 |
| KR | 1020050017117 A | 2/2005 |
| KR | 1020060119968 A | 11/2006 |

* cited by examiner

Figure 7

(a) $\begin{bmatrix} R_{bc} \\ G_{bc} \\ B_{bc} \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} R_{bo} \\ G_{bo} \\ B_{bo} \end{bmatrix} + \begin{bmatrix} b_1 \\ b_2 \\ b_3 \end{bmatrix}$ (b) $\begin{bmatrix} R_{wc} \\ G_{wc} \\ B_{wc} \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} R_{wo} \\ G_{wo} \\ B_{wo} \end{bmatrix} + \begin{bmatrix} b_1 \\ b_2 \\ b_3 \end{bmatrix}$ (c) $\begin{bmatrix} R_{rc} \\ G_{rc} \\ B_{rc} \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} R_{ro} \\ G_{ro} \\ B_{ro} \end{bmatrix} + \begin{bmatrix} b_1 \\ b_2 \\ b_3 \end{bmatrix}$ (d) $\begin{bmatrix} R_{gc} \\ G_{gc} \\ B_{gc} \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} R_{go} \\ G_{go} \\ B_{go} \end{bmatrix} + \begin{bmatrix} b_1 \\ b_2 \\ b_3 \end{bmatrix}$

Figure 8

$$\begin{bmatrix} R_{bc} & R_{wc} & R_{rc} & R_{gc} \\ G_{bc} & G_{wc} & G_{rc} & G_{gc} \\ B_{bc} & B_{wc} & B_{rc} & B_{gc} \\ 1 & 1 & 1 & 1 \end{bmatrix} = \begin{bmatrix} t_{11} & t_{12} & t_{13} & b_1 \\ t_{21} & t_{22} & t_{23} & b_2 \\ t_{31} & t_{32} & t_{33} & b_3 \\ 0 & 0 & 0 & 1 \end{bmatrix} \begin{bmatrix} R_{bo} & R_{wo} & R_{ro} & R_{go} \\ G_{bo} & G_{wo} & G_{ro} & G_{go} \\ B_{bo} & B_{wo} & B_{ro} & B_{go} \\ 1 & 1 & 1 & 1 \end{bmatrix}$$

$$C \qquad = \qquad T \qquad\qquad O$$

Figure 10
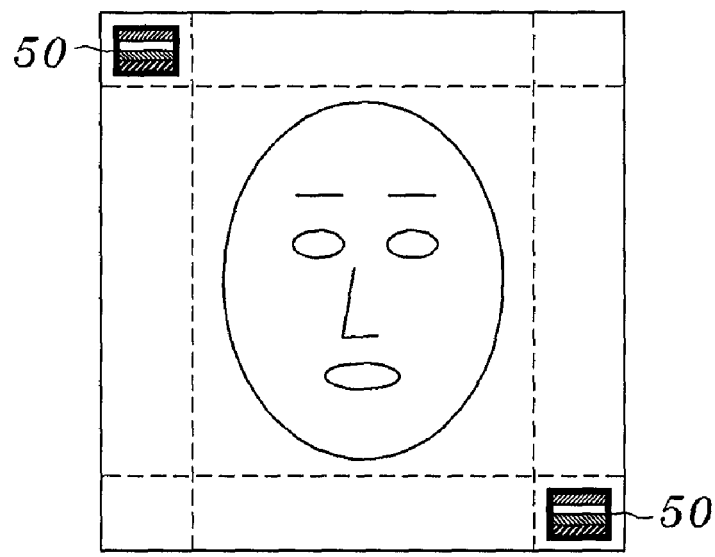 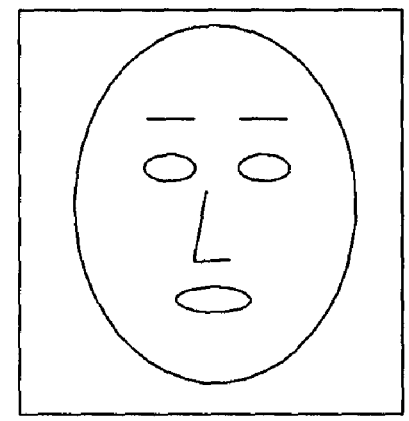
(a)
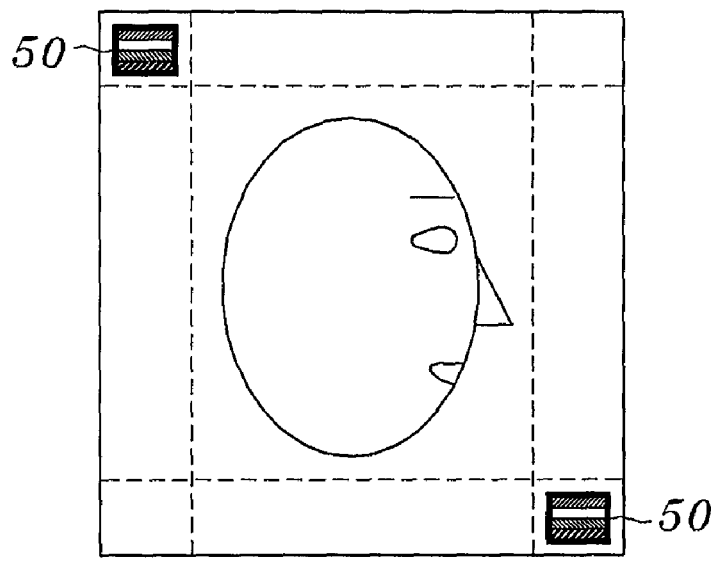 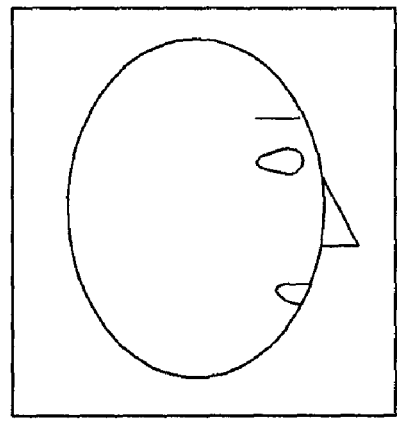
(b)

Figure 11
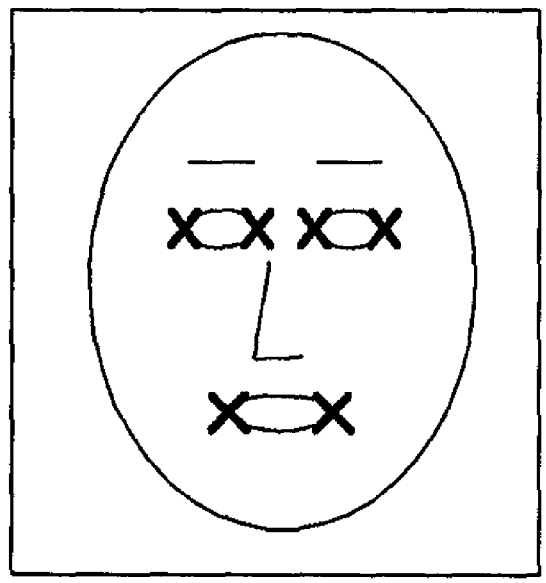
(a)
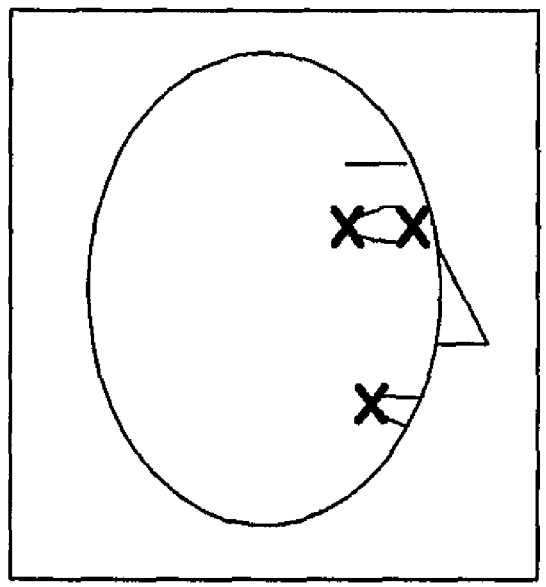
(b)

(a)  (b)

METHOD FOR GROUPING 3D MODELS TO CLASSIFY CONSTITUTION

CROSS-REFERENCE TO RELATED APPLICATIONS

This application is a 371 of PCT/KR2008/005542 filed on Sep. 19, 2008, which claims the benefit of Korean Application Nos. 10-2008-0062832 filed on Jun. 30, 2008, 10-2008-0062833 filed on Jun. 30, 2008, and 10-2008-0062834 filed on Jun. 30, 2008, the contents of each of which are incorporated herein by reference.

TECHNICAL FIELD

The present disclosure relates to a three-dimensional model classification method, and more particularly, to a three-dimensional model classification method of classifying constitutions by using image information generated after generating a three-dimensional geometric model and feature point information using a frontal image and a profile image of a subject.

BACKGROUND ART

Generally, a healthy person at ordinary time may not recognize his constitutionally weak point because he feels little physical pain during his illness. However, someone having a weak bronchus may always catch cold and have a chronic cough. Also, someone having a weak stomach may suffer from indigestion frequently. On the other hand, someone is said to have a stomach like a melting furnace because he has very strong stomach. There are many people complaining of various symptoms such as a frequent evacuation caused by weak viscera and a frequent swelling caused by poor urination.

These people may self-diagnose themselves as having a weak bronchial constitution, a weak stomachic constitution, a weak visceral constitution, or a weak renal constitution. Thus, the reason why people complain of physical pains different from each other is that each person is born with his own constitution of visceral (the five viscera and the six entrails) functions different from others inherently.

The constitution of a man also affects the form of his face or his figure. Accordingly, the people having the same constitution have common features in their faces and figures.

The features of each sasang constitution (Tae-yangin, Tae-eumin, So-yangin and So-eumin in sasang constitutional medicine theorized by Lee, Je-ma) observed through various literatures (reference literatures: donguisusebowon, bojeyeonseol, keumkyebibang, sasangbyun, sasangyeonui, sasangbangyakhabpyun, sasangjinryobowon, sasangyogeol, yeonbyun sasang constitutional medicine, etc.) and clinical experiments will be described as follows.

Tae-yangin has a clear face style, a big head, a broad forehead, thick eyebrows, big ears and a high-bridged nose.

So-yangin has a small and round head, a narrow and sharp chin, tiny earlobes, a thin lip, and a small mouth.

Tae-eumin has a wide and flat face, a wide chin, a wide forehead, thick ears, and a big and dull nose, and a thick lip.

So-eumin has an oval face which is some long compared to body, a narrow and protruded forehead, short width brows, tiny eyes, big earlobes, a hollow ear like a bowl, a small nose, a big and protruded mouth.

Accordingly, the sasang constitution of a subject may be determined by features of the face according to each sasang constitution.

However, when an Oriental doctor diagnoses a patient based on these features, his subjective opinion may be intervened into the diagnosis result. Also, as scientific technologies develop, it has been necessary to remotely diagnose symptoms of an illness using only image information.

For this, it may be important to obtain and transmit the image information without any noise. However, in order to diagnose the condition of a patient using the image, it is more important to analyze and transform the image so that various images photographed at different time and place may have a similar effect with images photographed at the same time and condition.

When the image information is obtained through a camera, the color of the image may be varied in accordance with location and properties of a light source. For example, when the image is obtained using the light source located at a relatively higher place, the color of the lower half part or the upper half part of the face is different from the color of the actual subject.

Use of a frontal image of the subject having the color distortion in a diagnosis may result in a wrong diagnosis. Accordingly, in order to reduce an affect by the light source, the subject is required to be photographed by special lighting equipments in a closed room. However, this may cause inconvenience to the subject etc.

For a image diagnosis, there may be a need to correct color change and geometric information distorted at the time of photographing. For example, the form of the subject may be changed due to a vibration of the camera by a hand tremor. It is very difficult to correct the geometric information distortion because the shape of the human body is not linear but three-dimensional.

In order to synthesize a three-dimensional model using a two-dimensional image, two or more images having the same color reference are necessary. However, a difference between the color references of the images makes it difficult to synthesize the three-dimensional model.

Also, two or more two-dimensional images are necessary to make a three-dimensional model. However, the plurality of flat images may have different colors according to the photographing condition such as a time, a place, an illumination etc. If the equal parts have different colors, there is a possibility to misjudge presence/absence of abnormality due to inconsistent colors of the three-dimensional model. Also, when the irregular contour of the face of the actual subject is not taken into account, it is difficult to show an exact three-dimensional color. This may result in a wrong diagnosis.

As a related art technology, there are an image contrast system and method using a three-dimensional object model, and a computer readable storage medium recorded with a image contrast program (Korean Patent Publication No. 2005-0017117 published Feb. 21, 2005), which discloses a method of high-speed retrieving a reference image stored at database from an input image with respect to an object photographed under condition of different postures and illuminations. The above invention does compare not a three-dimensional model but a reference image of the three-dimensional model, i.e., the two-dimensional image. Accordingly, it is impossible to determine the sasang constitution which is characterized by the three-dimensional face structure.

Other related art technologies relevant to an image recognition and analysis will be described below.

First, a form recognition apparatus and a method thereof (Korean Patent Publication No. 2006-0119968 published Nov. 24, 2006. 11. 24) discloses an apparatus and a method of recognizing a face by capturing an image. However, the image may be distorted by an illumination or other circumferential environments because there is no configuration about a correction of the image.

Next, the photographing system (Japanese Patent Publication 2003-209849 published Jul. 25, 2003) discloses a method of correcting a color channel from a reference image by install a reflecting plane at the lower part of a cap which opens and closes a lens. Although sensitive to changes of colors, this method has a limitation in that it is difficult to correct the color channel by reflecting a condition of a light projected to an actual object.

Next, a face image indication method and a face image processing unit (Japanese Patent Publication 2002-010283 published Jan. 11, 2002) is configured to correct the face image using an illuminance correction factor calculated from RGB values of a color table image, which is outputted from a camera to a computer. However, this method has a limitation in that it is difficult to solve a plurality of partial color distortions which may occur in a photographed image because a whole image is in a lump corrected in accordance with the illuminance.

DISCLOSURE

Technical Problem

Therefore, an object of the present invention is to provide a method of generating a three-dimensional model having an exact color by obtaining a flat image without a color distortion through a color reference unification of a plurality of flat images and matching feature points at the flat images of various angles or obtaining a depth information of a face through an irradiation of a structured light.

Another object of the present invention is to provide a three-dimensional classification method of classifying constitutions by obtaining feature point information of the three-dimensional geometric model, comparing the feature point information with those of a reference model representing a majority in database to find a most approximate model.

Technical Solution

To achieve these and other advantages and in accordance with the purpose(s) of the present invention as embodied and broadly described herein, a three-dimensional model classification method of classifying constitutions in accordance with an aspect of the present invention includes: correcting color values of a frontal image and one or more profile images to allow a color value of a reference color table in the images to equal a predetermined reference color value, through obtaining the frontal image and one or more profile images of a subject including the reference color table by a camera, the reference color table including one or more sub color regions; generating a three-dimensional geometric model of the subject by extracting feature point information from the frontal image and the profile image, matching the corresponding feature point information to extract spatial depth information, after removing the reference color table region from the frontal image and the profile image; and classifying a group of the three-dimensional geometric model of the subject by selecting a reference three-dimensional geometric model having a smallest sum of spatial displacements from the three-dimensional geometric model of the subject from a plurality of reference three-dimensional geometric models stored in the database and dividing the three-dimensional geometric model of the subject into a group including the selected reference three-dimensional geometric model.

Advantageous Effects

A color image correction method according to the present invention can obtain an image having an exact color value in spite of photographing in an open space. The method has an effect of reducing danger of wrong diagnosis because diagnosis is performed through an image of an exact color value.

Also, a three-dimensional model can be easily composed because a color reference of images obtained at two or more time points are identical to each other. Furthermore, the present invention has an effect of correcting potential color distortions of all positions due to an illumination.

According to the present invention, more exact comparison of geometric properties is possible by comparing three-dimensional models. Also, by comparing the three-dimensional model of a subject with a reference three-dimensional model, the present invention is less sensitive to an error. Furthermore, it is possible to more exactly classify constitutions because reference models standardized by data of many people are used.

DESCRIPTION OF DRAWINGS

FIG. 7 is a diagram illustrating a determinant made using each sub color region.

FIG. 8 is a diagram illustrating a determinant derived from the determinant in FIG. 7.

FIG. 10 is a diagram illustrating a process of removing a reference color table region from a frontal image and a profile image.

FIG. 11 is a diagram illustrating feature points in a frontal image and a profile image.

BEST MODE

A three-dimensional model classification method of classifying constitution according to an embodiment of the present invention includes a color correction step, a three-dimensional geometric model generation step, and a group classification step.

First, in the color correction step, a frontal image and one or more profile images of a subject with a reference color table including one or more sub color regions are obtained by a camera. Color values of the frontal image and one or more profile images are corrected so that a color value of a reference color table in the obtained image corresponds to a predetermined reference color value.

In the geometric model generation step, after removing the reference color table region from the frontal image and the profile image where the color values are corrected, feature point information is extracted from the frontal image to be matched with the corresponding feature point information. Thus, spatial depth information is extracted to generate a three-dimensional geometric model of the subject.

In the group classification step, a reference three-dimensional geometric model having the smallest sum of spatial displacement from the three-dimensional geometric model of the subject is detected from a plurality of reference three-dimensional geometric models stored in the database. A group including the detected reference three-dimensional geometric model is set to be a group to which the three-dimensional geometric model of the subject belongs.

Each reference three-dimensional geometric model representing each group classified into various constitutions and feature point information of the corresponding three-dimensional geometric model are stored in the database.

Here, the reference three-dimensional geometric model representing each constitution may be determined by the various methods. As an example, the reference three-dimensional geometric model may include three-dimensional geometric data on a virtual face artificially generated using the geometric features of the faces representing various constitutions as described in the background art.

As another example, three-dimensional geometric models are collected from many people having various constitutions. Three-dimensional geometric models are analyzed to generate average data. Then, three-dimensional geometric models generated by the average data may be used as the reference three-dimensional geometric model for each constitution group.

MODE FOR INVENTION

Hereinafter, preferred embodiments of the present invention will be described with reference to the accompanying drawings.

Figure 1:
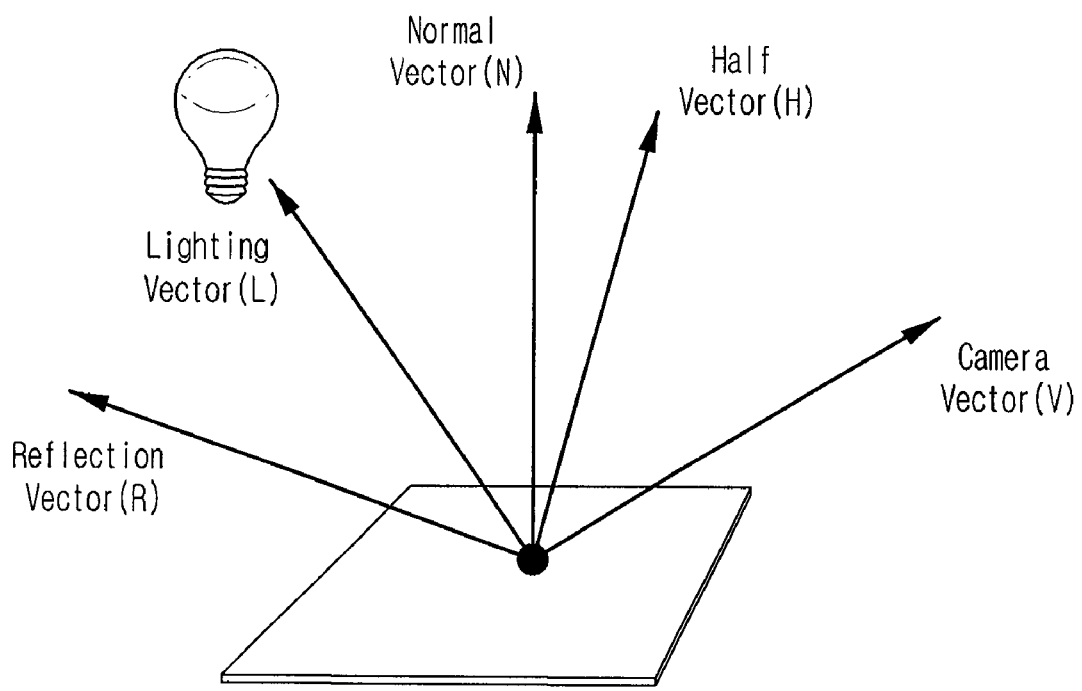
FIG. 1 is a diagram illustrating general factors determining color.

FIG. 1 is a diagram illustrating general factors determining color.

Referring to FIG. 1, when light is irradiated onto an object, a color of the object is determined by the various factors.

The factors includes a reflection vector (R), a light source vector (L), a normal vector (N), a half vector (H) and a camera vector (V). A color determination formula obtained by this factor may be expressed as the following Equation 1:

$$I = k_a L_a + k_d (L \cdot N) L_d + k_s (R \cdot V)^a L_s \quad \text{Equation 1}$$

where $k_a$, $k_d$ and $k_s$ are constants, $L_a$ is a circumferential color, $L_d$ is the color of the surface, and $L_s$ is the color of the light source.

In order to constitute a three-dimensional model with a plurality of flat images for a face diagnosis, it is necessary to correct color differences of the plurality of flat images.

Referring to Equation 1, it can be understood that a factor determining the color is generally a multiplication of the surface color by the light source and an addition of the circumferential color if a reflection to the light source is excluded ($K_s = 0$).

A determinant showing a relationship between an original color value and a changed color value may be expressed as the following Equation 2. Referring to Equation 2, it can be understood that the change of the color with respect to the light may be expressed by an addition and a multiplication.

$$\begin{bmatrix} R_c \\ G_c \\ B_c \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R_o \\ G_o \\ B_o \end{bmatrix} + \begin{bmatrix} b_1 \\ b_2 \\ b_3 \end{bmatrix} \quad \text{Equation 2}$$

In the Equation 2, it can be understood that the changed color ($R_C$, $G_c$ and $B_C$) equals a multiplication of a color correction matrix from the light source by the original color ($R_o$, $G_o$ and $B_o$), and an addition of a conversion vector ($b_1$, $b_2$ and $b_c$) by the circumferential color.

Based on this basic concept, embodiments of the present invention will be concretely described below.

A three-dimensional model classification method of classifying constitution according to an embodiment of the present invention includes a color correction step, a three-dimensional geometric model generation step, and a group classification step.

First, in the color correction step, a frontal image and one or more profile images of a subject with a reference color table including one or more sub color regions are obtained by a camera. Color values of the frontal image and one or more profile images are corrected so that a color value of a reference color table in the obtained image corresponds to a predetermined reference color value.

In the geometric model generation step, after removing the reference color table region from the frontal image and the profile image where the color values are corrected, feature point information is extracted from the frontal image to be matched with the corresponding feature point information. Thus, spatial depth information is extracted to generate a three-dimensional geometric model of the subject.

In the group classification step, a reference three-dimensional geometric model having the smallest sum of spatial displacement from the three-dimensional geometric model of the subject is detected from a plurality of reference three-dimensional geometric models stored in the database. A group including the detected reference three-dimensional geometric model is set to be a group to which the three-dimensional geometric model of the subject belongs.

Figure 2:
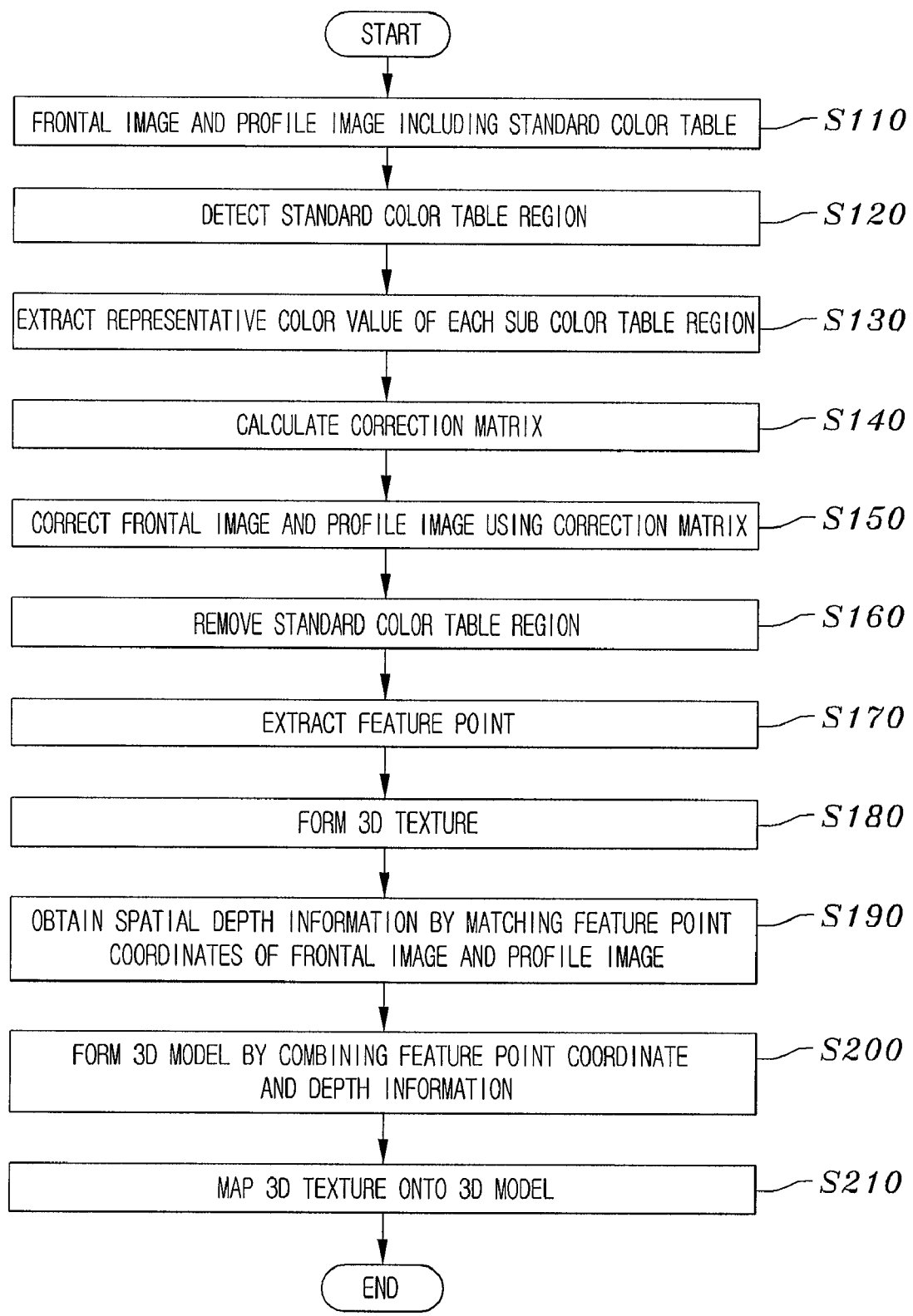
FIG. 2 is a flowchart of a color correction method according to an embodiment of the present invention.

FIG. 2 is a flowchart of a color correction method according to an embodiment of the present invention.

First, in step S110, a color correction method for the image diagnosis according to the present invention obtains a frontal image and a profile image of a subject including a reference color table. Hereinafter, a process with respect the frontal image will be described, but the process is equally applied to the profile image.

Here, two of more the reference color tables are provided, which are spaced from face of a subject by a predetermined distance.

Figure 3:
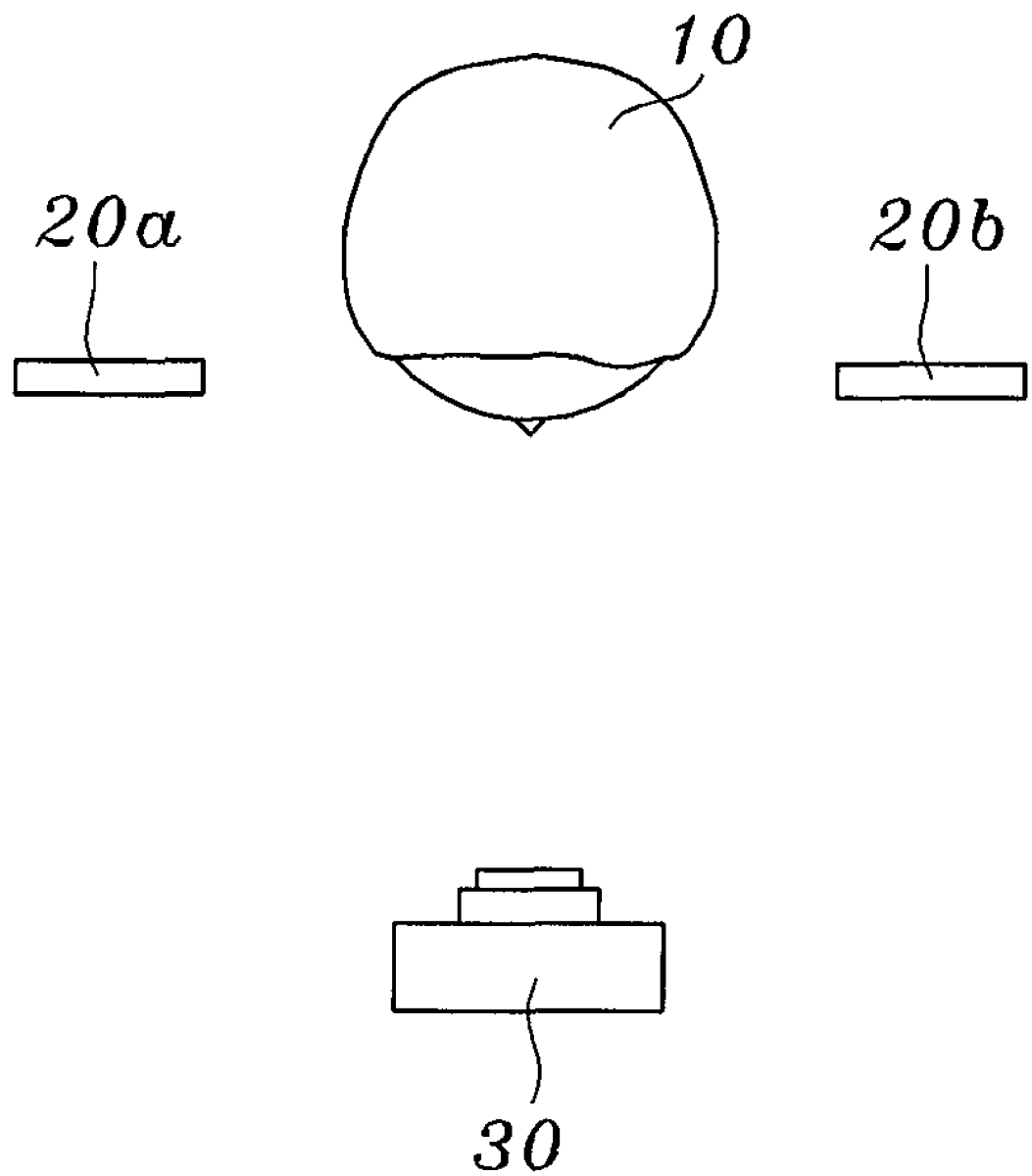
FIGS. 3 and 4 are diagrams illustrating an apparatus photographing a reference color table and a subject.
Figure 4:
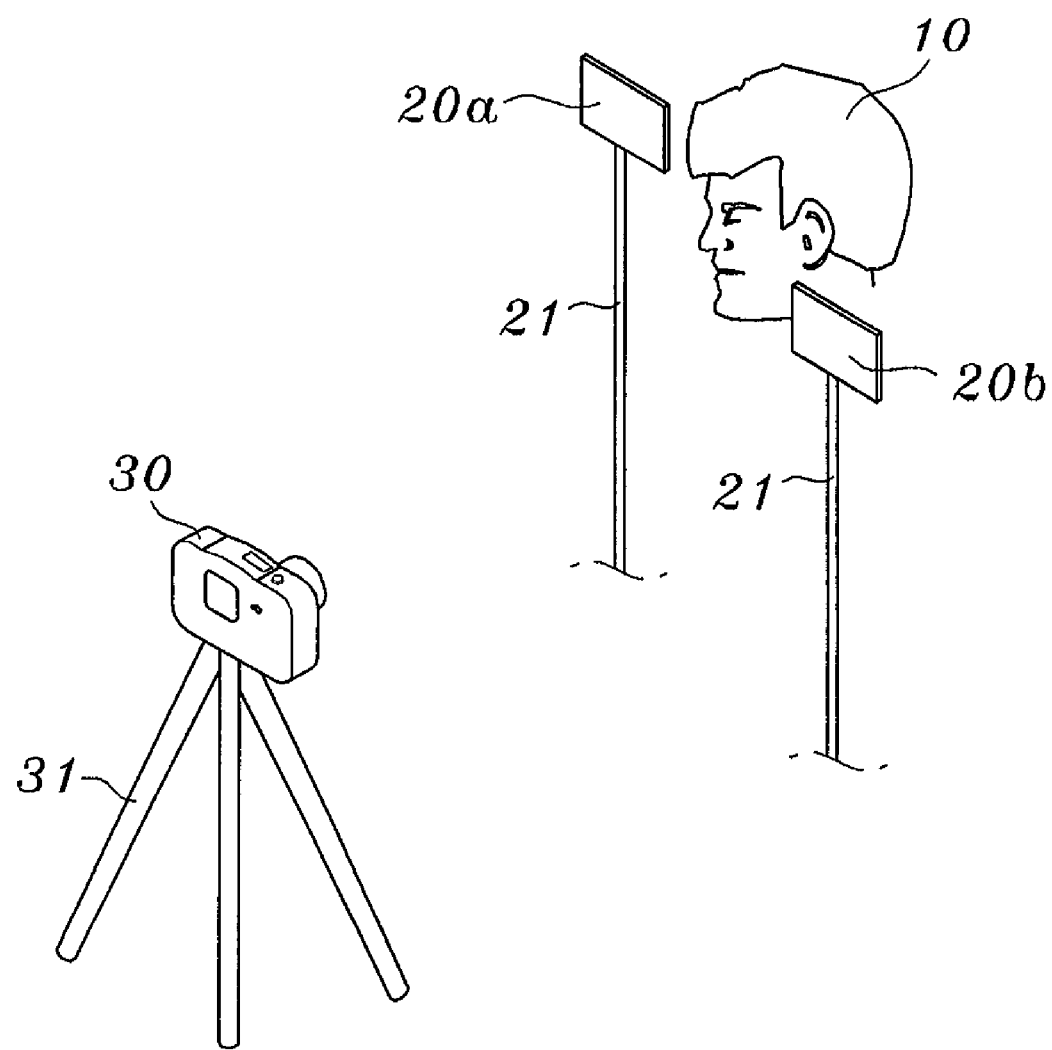

FIGS. 3 and 4 are diagrams illustrating an apparatus photographing a reference color table and a subject.

FIG. 3 is a top view of an apparatus photographing a reference color table and a subject, and FIG. 4 is a side view of the apparatus photographing the reference color table and the subject.

Referring to FIG. 3, reference color tables 20a and 20b are located at the both sides of the face of the subject 10 perpendicularly to a photographing direction of the camera 30. The camera 30 photographs the subject and the reference color table together.

Referring to FIG. 4, the camera 30 is supported by the camera supporter 31, and the reference color table 20a is supported by the color table supporter 21.

The reference color table is vertically located so as not to be tilted. If there are two the reference color tables, One 20a is located at a height of the upper half part of the face, and the other 20b is located at a height of the lower half part of the face.

The above process is equally applied to the profile image.

Figure 5:
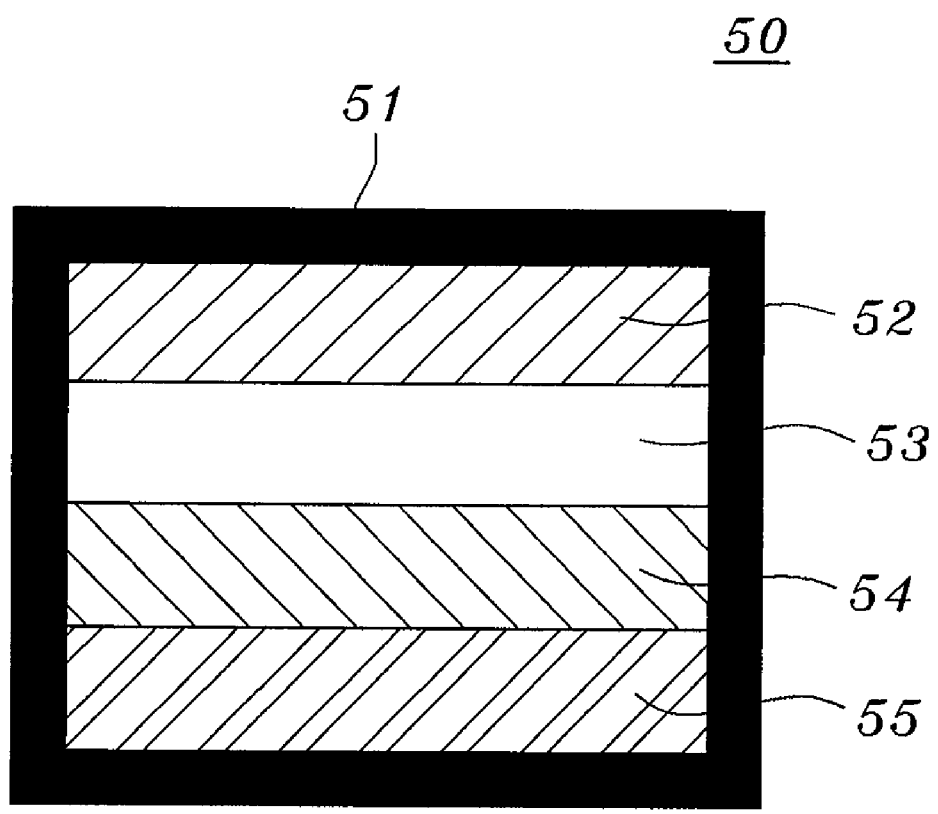
FIG. 5 is a diagram illustrating a reference color table according to an embodiment of the present invention.

FIG. 5 is a diagram illustrating a reference color table according to an embodiment of the present invention.

Referring to FIG. 5, a reference color table 50 may include a plurality of sub color regions.

As an example, the sub color region may include five color regions, i.e., a first color region of outline part 51, and second to fifth color regions 52 to 55.

The color regions except the color region of outline part 51 may include, but not limited thereto, four or more color regions including the three primary colors.

Here, the first color region 51 may be black (R=0, G=0, B=0), the second color region 52 may be blue (R=0, G=0, B=255), the third color region 53 may be white (R=255, G=255, B=255), the fourth color region (54) may be red (R=255, G=0, B=0), and the fifth color region (55) may be green (R=0, G=255, B=0). In the embodiments of the present invention, a color value representing the sub color region of the reference color table is called a reference color value.

The reference color table may include colors irrelevant to circumferential environmental colors, and be made of material having low reflexibility. Because the outline part of the reference color table is black, it is desirable that a color of the background is bright at the time of photographing.

Figure 6:
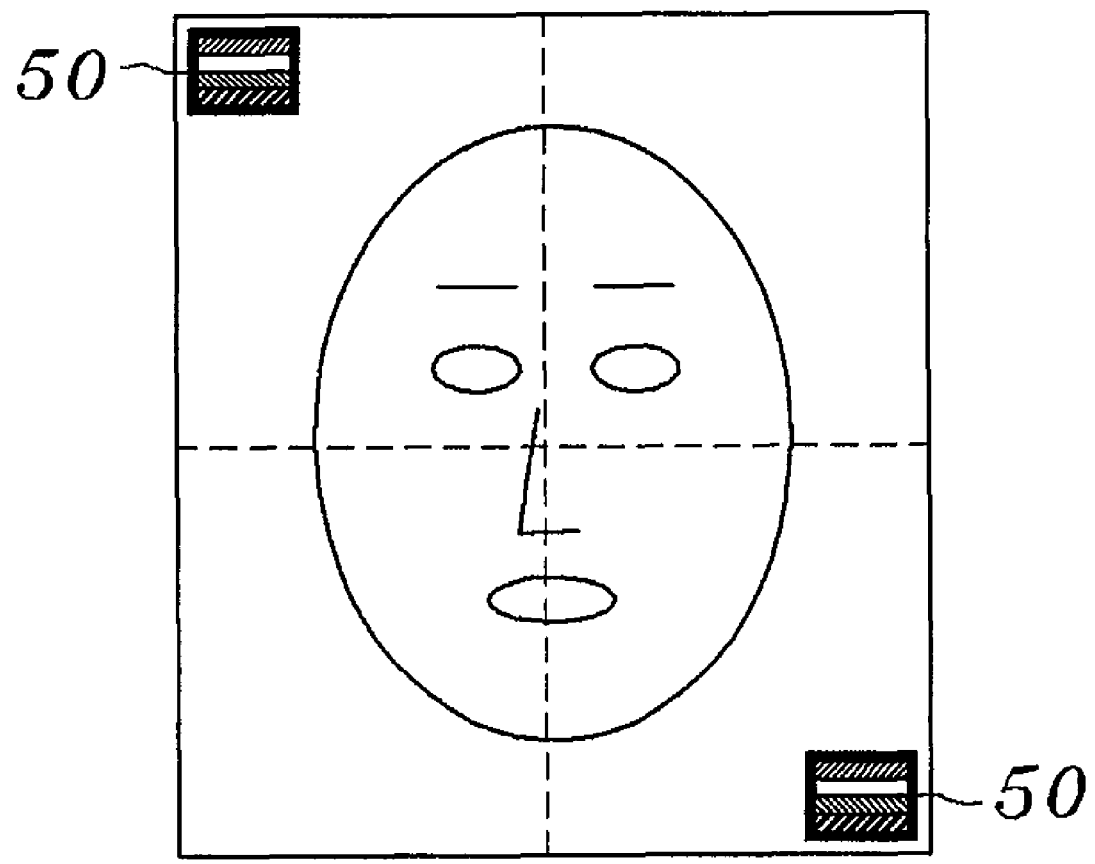
FIG. 6 is a diagram illustrating a frontal image obtained by the camera according to an embodiment of the present invention.

FIG. 6 is a diagram illustrating a frontal image obtained by the camera according to an embodiment of the present invention.

Referring to FIG. 6, the reference color tables are installed at both sides of the face. However, one is located at a height of the lower half part, the other is located at a height of the upper half part.

According to an embodiment of the present invention, a plurality of the reference color tables may be installed to correct colors of regions surrounding the reference color table. In this case, if two reference color tables are installed, the reference color tables are located in the first quadrant and the third quadrant, or the second quadrant and the fourth quadrant on the basis of the photographed frontal image, respectively. That is, in order to effectively correct the whole image, two reference color tables are diagonally installed.

As described above, two or more reference color tables and the face of the subject are photographed by the camera in order to obtain the frontal image.

Hereinafter, a color correction method will be more particularly described using a first reference color table located at the second quadrant and a second reference color table located at the fourth quadrant.

In step S120, the reference color table region and the sub color region detected from the obtained frontal image.

The reference color table refers to an actual color table used in the photographing step. The reference color table region refers to a photographed part of the reference color table in the obtained image.

Various methods of detecting the reference color table region and the sub color region from the frontal images may be used.

For example, in the first reference color table region, two corner points close to black are detected from the second quadrant of the upper half part in a right direction from a left outline of the image. The corner point may use an algorithm such as Harris Corner Detector.

A black corner point nearest in the right direction from the two detected corner points is discriminated by RGB threshold.

A color part having a color value lower than the threshold is set to a black part, in which the corner point of each sub color region is detected.

In the second reference color table region, two corner points close to black are detected from the fourth quadrant of the lower half part in a left direction from a right outline of the image. A black corner point nearest in the left direction from the two detected corner points is discriminated by RGB threshold.

A color part having a color value lower than the threshold is set to a black part, in which the corner point of each sub color region is detected.

In step S130, a representative color value of the each sub color region is calculated.

According to a first embodiment to obtain the representative color value of the each sub color region, a center coordinate of each sub color region is detected, the color value which is set to the representative color value of the corresponding sub color region. This is because the color value of edge part of each sub color region is not clearly discriminated from the color value of the neighboring region due to a more or less mixed color of the photographed image.

According to a second embodiment to obtain the representative color value of the each sub color region, after the color value of all pixels of each sub color region are added up, the color value is divided by the number of pixels to obtain an average color value. The average color value is set to the representative color value of the corresponding sub color region. All representative values of each sub color region of the first reference color table region and the second reference color table region are obtained through the above process.

After obtaining the representative color value of each sub color region as described above, the color value of the frontal image is corrected by a changed numerical value between each representative color value calculated as above and the reference color value of sub color region in the reference color table used at the time of photographing.

More particularly, in step S140, a first correction matrix transforming the representative color value of each sub color region included in the first reference color table region so as to equal the reference color value of each sub color region of the first reference color table is obtained. That is, the first correction matrix is a correction matrix which transforms a color-distorted image into the reference color value of the original reference color table.

$$\begin{bmatrix} R_{cs} \\ G_{cs} \\ B_{cs} \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} R_{os} \\ G_{os} \\ B_{os} \end{bmatrix} + \begin{bmatrix} b_1 \\ b_2 \\ b_3 \end{bmatrix} \quad \text{Equation 3}$$

The correction matrix is basically obtained using the Equation 3.

Here, $R_{cs}$, $G_{cs}$, $B_{cs}$ are RGB values for each sub color region of the reference color table, $t_{11}$ to $t_{33}$ are factors of the correction matrix with respect to the surface color, $R_{os}$, $G_{os}$, $B_{os}$ are representative color values for each sub color region of the reference color table region detected from the photographed image, and b1 to b3 are factors of the correction matrix with respect to the circumferential color.

When obtaining the first correction matrix, the left matrix including $R_{cs}$, $G_{cs}$, B, is the color value of the first reference color table used in the photographing, the two right matrixes including t values and b values are the first correction matrix, and the matrix including $R_{os}$, $G_{os}$, $B_{os}$ is the color value of the first reference color table region extracted from the frontal image.

The first correction matrix may be obtained by substituting the color value of each sub color region of the first reference color table region in the Equation 3 as described in FIG. 7.

FIG. 7 is a diagram illustrating a determinant made using each sub color region. As shown in FIG. 7, color values of the blue color region, the white color region, the red color region, and the green color region are substituted in (A), (B), (C), and (D), respectively FIG. 8 is a diagram illustrating a determinant derived from the determinant in FIG. 7.

As shown in FIG. 8, the C matrix is the reference color value of each sub color region in the reference color table, the T matrix is the correction matrix, and the O matrix is color values of each sub color region in the reference color table region in the photographed image.

Because the C matrix and the O matrix are known values, the T matrix is obtained by the determinant in FIG. 8. The value obtained by using the first reference color table is the first correction matrix $T_1$.

Similarly, a second correction matrix $T_2$ transforming the representative color value of each sub color region included in the second reference color table region so as to equal the reference color value of each sub color region of the second reference color table is obtained.

Next, by using the first correction matrix $T_1$ and the second correction matrix $T_2$, a third correction matrix $T_3$ linearly transforming all pixels included in the frontal image in accordance with relative distances from the center coordinate of the first reference color table region and the center coordinate of the second reference color table region is obtained as shown in the following Equation 4.

Figure 9:
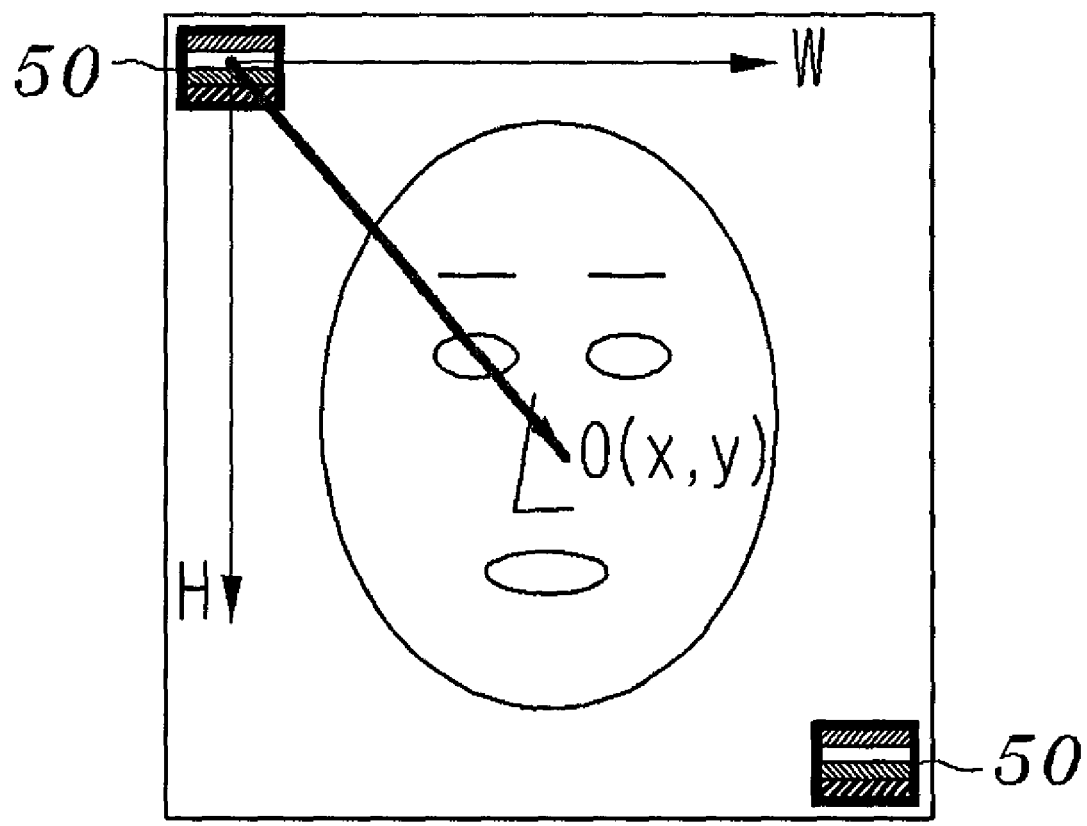
FIG. 9 is a diagram for obtaining a final correction matrix in order to correct all pixels of a still image photographed by a camera.

FIG. 9 is a diagram for obtaining a final correction matrix in order to correct all pixels of a still image photographed by a camera.

Referring to FIG. 9, a final correction matrix in the color correction method according to the present invention may be obtained as follows.

In order to track the change of the color at a certain location, $O_3$ value becomes linear between $O_1$ and $O_2$ in two-dimensional space. As described in FIG. 9, W and H mean a width and a height from the center position of the first reference color table region to the center position of the second reference color table region, respectively. Here, the center position of the reference color table region means the center point of four corner points.

$$\text{When } C = T_1 O_1, \text{ and } C = T_2 O_2, \quad \text{Equation 4}$$

$$C =$$

$$T_3 O_3 = T_3 \frac{\left( \sqrt{(W-x)^2 + (H-y)^2} \, O_1 + \sqrt{x^2 + y^2} \, O_2 \right)}{\sqrt{x^2 + y^2} + \sqrt{(W-x)^2 + (H-y)^2}}$$

$$T_3(x, y) = \left( \sqrt{x^2 + y^2} + \sqrt{(W-x)^2 + (H-y)^2} \right)$$

$$C \left( \sqrt{(W-x)^2 + (H-y)^2} \, O_1 + \sqrt{x^2 + y^2} \, O_2 \right)^{-1}$$

In step S150, by using the third correction matrix ($T_3$ (x, y)), which is the final correction matrix, a correction with respect to all pixels in the obtained still image is performed according to the following Equation 5.

$$P'(x,y) = T_3(x,y) P(x,y) \quad \text{Equation 5}$$

Although two reference color tables are exemplified in the embodiments, it will be appreciated that the correction may be equally performed even in a case of any number of reference color tables. Also, this invention will not be limited to only RGB color coordinate systems, but may be equally applied to different color coordinate system.

Hereinafter, a three-dimensional geometric model generation method according to an embodiment of the present invention will be described with reference to FIGS. 10 to 11.

As described above, if the color correction of the frontal image and the profile image is performed, in step S160, the reference color table region 50 is removed from the frontal image and the profile image. FIG. 10 is a diagram illustrating a process of removing the reference color table region from the frontal image and the profile image. The reference color table region is removed as described in FIG. 10.

Feature point coordinates of the region corresponding to eye, nose, and mouth are extracted from the frontal image and the profile image where the reference color table region is removed. One three-dimensional texture is formed by matching the feature points corresponding to each other in the frontal image and the profile image.

In step S170, after the reference color table region is removed from the frontal image and the profile image removal, the feature point coordinates are detected from the image where the reference color table region is removed.

FIG. 11 is a diagram illustrating feature points in a frontal image and a profile image.

In step S180, one three-dimensional texture is formed by matching the feature point coordinates corresponding to each other after the feature point coordinates are extracted as described in FIG. 11.

In step S190, the spatial depth information is detected by matching the feature point coordinates extracted from the frontal image with feature point coordinates extracted from the profile image.

In step S200, a model having three-dimensional geometric information is generated by combining the extracted feature point coordinates and the spatial depth information.

In step S210, a final color model having the three-dimensional geometric information is completed by mapping the three-dimensional texture generated in the step S180 on the three-dimensional model.

Although eye, nose, and mouth are considered major feature point information in this embodiment, it will be appreciated that various parts of the face can be the feature point information.

According to another embodiment of the present invention, structured light may be used in order to detect the depth information.

The structure light having a certain pattern is irradiated onto the subject at a predetermined angle with the camera to obtain the frontal image and the profile image. The depth information may be detected by using the distortion of the pattern in the frontal image and the profile image.

Hereinafter, a three-dimensional model classification method for the constitutional classification according to an embodiment of the present invention will be described with reference to FIGS. 12 to 18.

Figure 12:
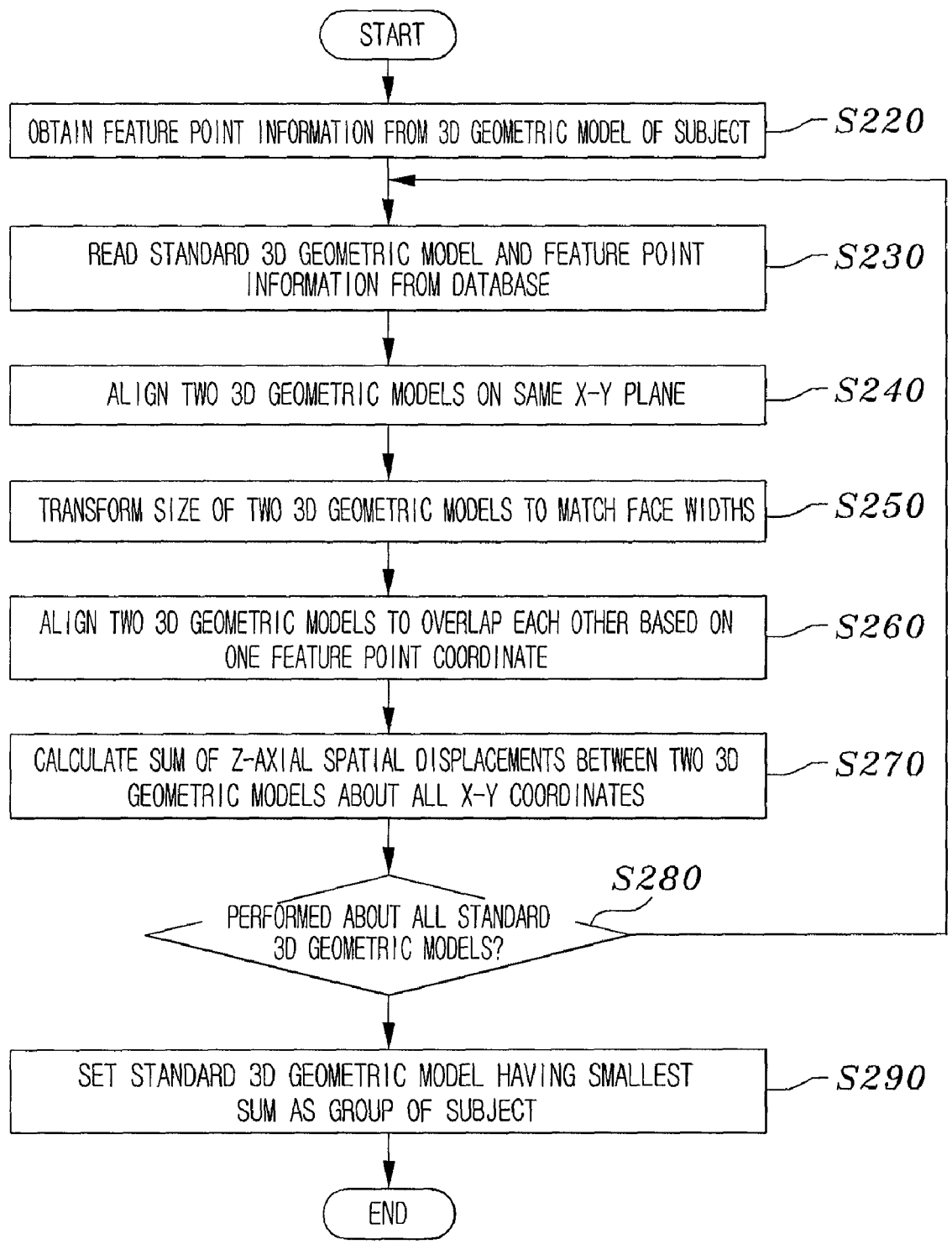
FIG. 12 is a flowchart illustrating a three-dimensional model comparison method of classifying sasang constitution according to an embodiment of the present invention.
Figure 13:
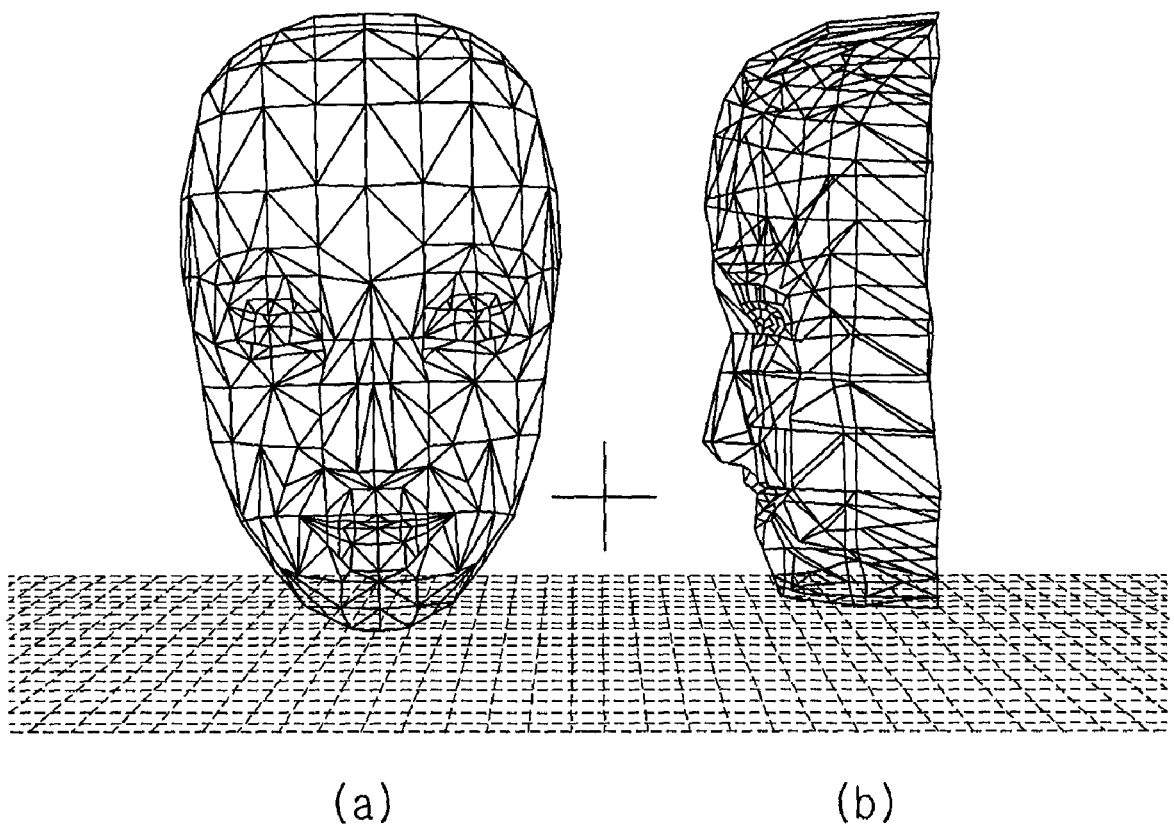
FIG. 13 is a diagram illustrating a three-dimensional geometric model used in an embodiment of the present invention.

FIG. 12 is a flowchart illustrating a three-dimensional model comparison method of classifying sasang constitution according to an embodiment of the present invention. FIG. 13 is a diagram illustrating a three-dimensional geometric model used in an embodiment of the present invention.

Referring to FIG. 12, the three-dimensional model classification method includes obtaining feature point information from the three-dimensional geometric model of the subject in step S220.

Here, the feature points refer to an eyebrow, eyes, a pupil, a nose, a lip region in the face. The feature point information refers the three-dimensional coordinates of the feature points.

The three-dimensional geometric model according to embodiments of the present invention means a three-dimensional geometric model of the face which clearly shows most important features in order to discriminate the sasang constitution as described in FIG. 13.

In FIG. 13, (A) is a front view of the three-dimensional geometric model, and (B) is a side view of the three-dimensional geometric model.

Figure 14:
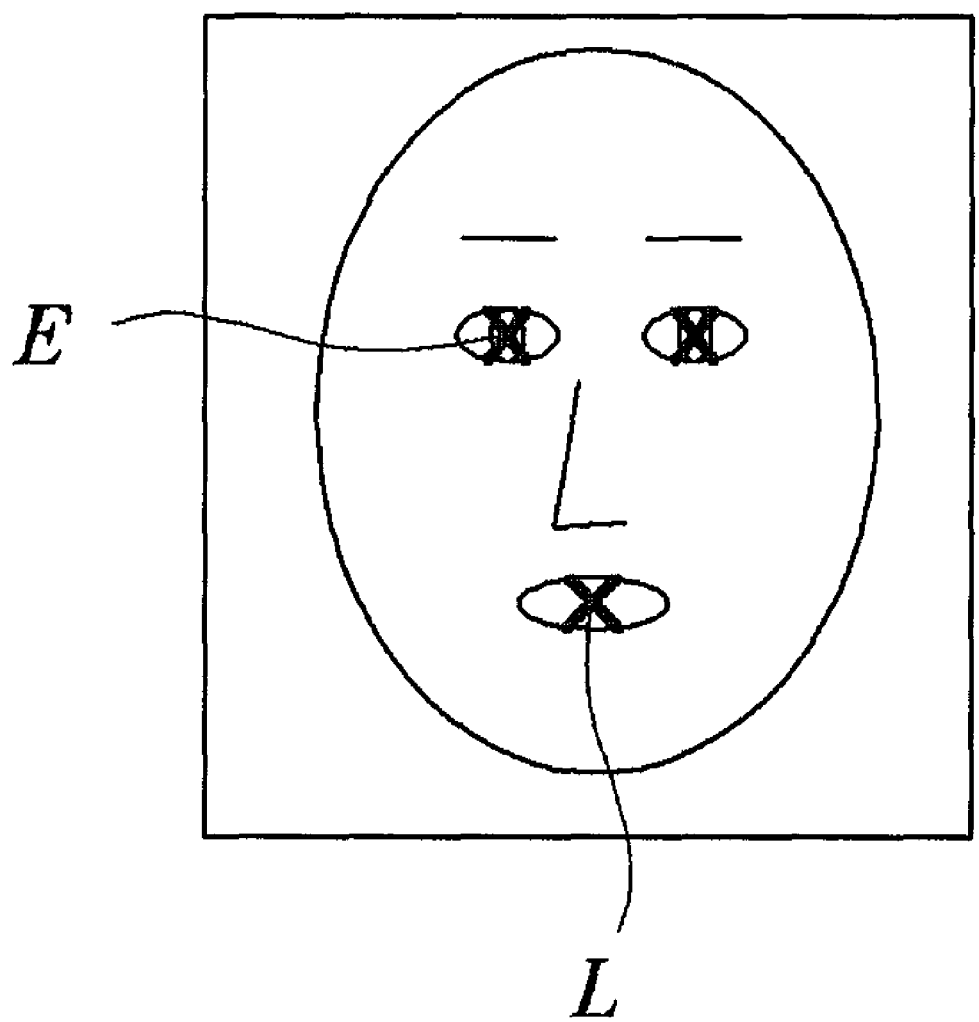
FIG. 14 is a diagram illustrating feature points in a color image.
Figure 15:
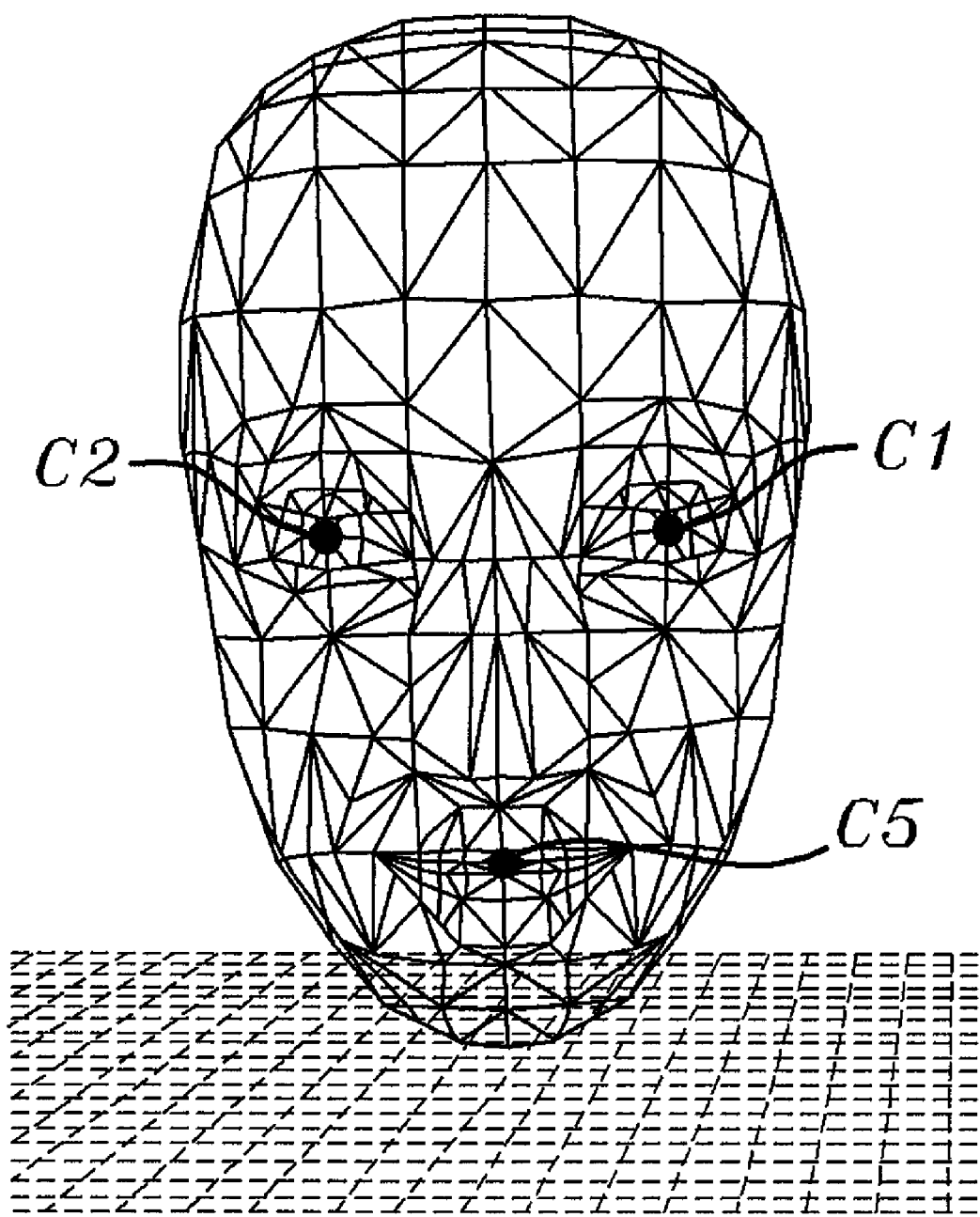
FIG. 15 is a diagram illustrating feature points in a three-dimensional geometric model.

FIG. 14 is a diagram illustrating feature points in a color image. FIG. 15 is a diagram illustrating feature points in a three-dimensional geometric model.

Referring to FIGS. 14 to 15, the color image and the three-dimensional geometric model includes location coordinates of the eye, the nose, and the mouth corresponding to each other.

In the three-dimensional geometric model, it is impossible to extract the feature points because the eye, the nose, the ear and the mouth can not be discriminated. Accordingly, after extracting the feature points through color analysis of the color image, the two-dimensional coordinates of the corresponding feature points are extracted.

The eye E, the nose, the ear and the mouth L etc. may be discriminated through an image processing using a color difference from the circumference, a color change, a form of the feature point in order to extract the two-dimensional coordinate of the corresponding region. Any of well-know related algorithms may be used.

Feature point information, which is three-dimensional coordinates of the corresponding feature point, may be extracted using X, Y, Z coordinate which is three-dimensional information of the pixel corresponding to two-dimensional coordinates of the feature points. Referring to FIG. 15, feature point information of the pupil of the left eye C1, the pupil of the right eye C2, and the center of the lip C5 is described as an example.

After three-dimensional geometric model and feature point information are obtained from the subject, in step S230, one of the groups classified into the plurality of constitutions is selected from the database. The reference three-dimensional geometric model and feature point information representing the corresponding group are read from the group.

The three-dimensional geometric models representing the groups classified into the plurality of constitutions and the feature point information of the corresponding reference three-dimensional geometric models are stored in the database.

Here, the reference three-dimensional geometric model representing each constitution may be determined by the various methods. As an example, the reference three-dimensional geometric model may include three-dimensional geometric data on a virtual face artificially generated using the geometric features of the faces representing various constitutions as described in the background art.

As another example, three-dimensional geometric models are collected from many people having various constitutions. Three-dimensional geometric models are analyzed to generate average data. Then, three-dimensional geometric models generated by the average data may be used as the reference three-dimensional geometric model for each constitution group.

In step S240, the geometric model and the reference geometric model of the subject are aligned on the same X-Y plane.

Figure 16:
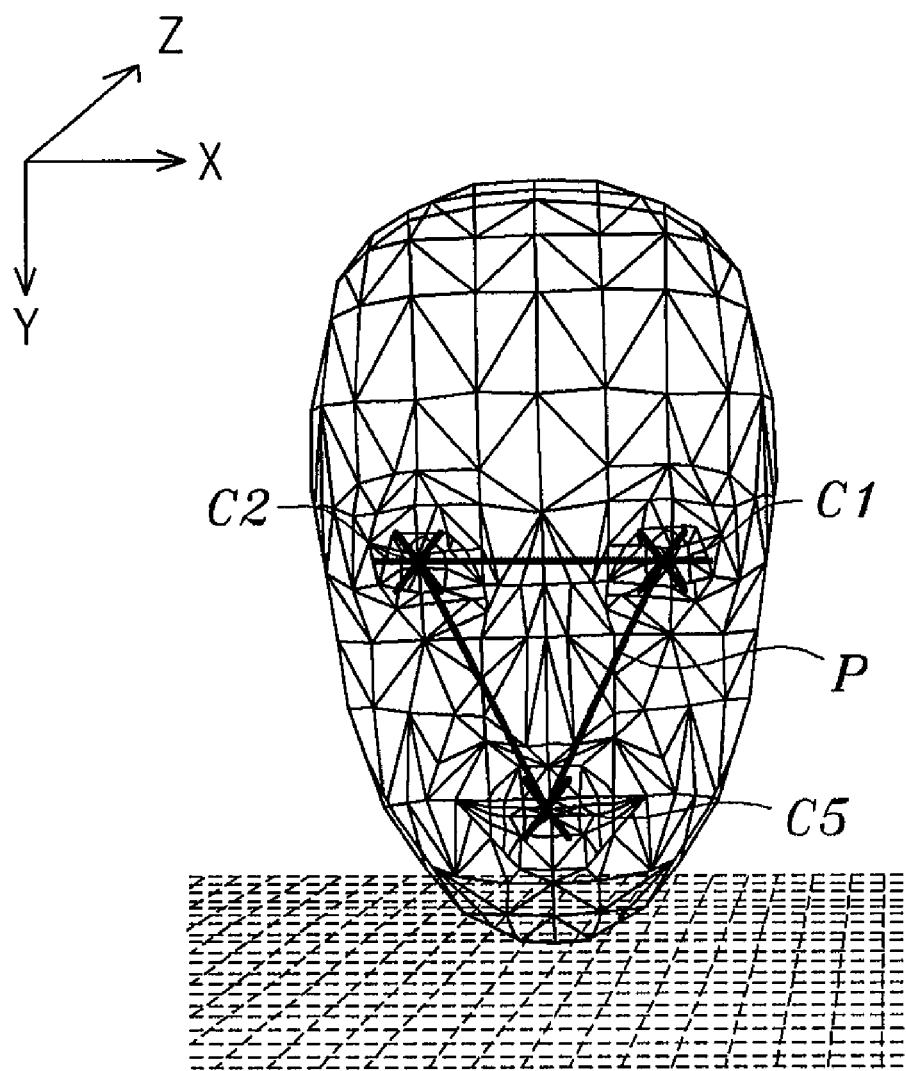
FIG. 16 is a diagram illustrating a process of aligning a three-dimensional geometric model parallel to an X-Y plane according to an embodiment of the present invention.

FIG. 16 is a diagram illustrating a process of aligning a three-dimensional geometric model parallel to an X-Y plane according to an embodiment of the present invention.

In order to match reference locations of the subject model and the reference model, a plane P obtained by connecting the center points of both pupils and the center of the lip is located parallel to an X-Y plane.

Assuming that C1 (x1, y1, z1) is the center point of the left pupil, C2 (x2, y2, z2) is the center point of the right pupil, and C5 (x5, y5, z5) is the center point (average location) of the lip, a, b, c, and d may be obtained by substituting the C1, C2 and C5 into a plane equation ax+by+cz+d=0, where a, b, and c are the normal vector of the plane.

When the normal vector is rotationally-transformed into [0, 0, c'], the plane P becomes parallel to the X-Y plane.

$$[0,0,c']^T = R_x R_y R_z [a,b,c] T \qquad \text{Equation 6}$$

where T means a transpose, and c' is a constant.

A rotation angle Rx about X-axis, a rotation angle Ry about Y-axis, a rotation angle Rz about Z-axis may be obtained from the Equation 6.

Next, all coordinates are transformed using RzRyRz.

$$C' = R_x R_y R_z (C - C1) + C1 \qquad \text{Equation 7}$$

where C is a previous coordinate, C' is a transformed coordinate. The Equation 7 is an equation transforming on the basis of C1.

Since C1 is the basis, C1 is unchanged, and C2 and C5 are transformed into C2' and C5', respectively.

Once the plane P becomes parallel to the X-Y plane, a straight line connecting C1 and C2 (the straight line connecting the centers of the both pupils at the transformed three-dimensional geometric model) is made parallel to the X-axis. That is, Y coordinate values of C1 and C2' equal each other.

In step S250, the face widths of the three-dimensional geometric model and the reference three-dimensional geometric model of the subject are made identical to each other.

In this case, the face width of the three-dimensional geometric model of the subject may be equalized to the face width of the reference three-dimensional geometric model. Also, the face width of the reference three-dimensional geometric model may be equalized to the face width of the three-dimensional geometric model of the subject.

However, it is desirable to equalize the face width of the subject to the face width of the reference model because the face width of the subject is variable in accordance with the subjects.

The face width of the three-dimensional model of the subject will be equalized to the face of the reference model in the following embodiments.

Figure 17:
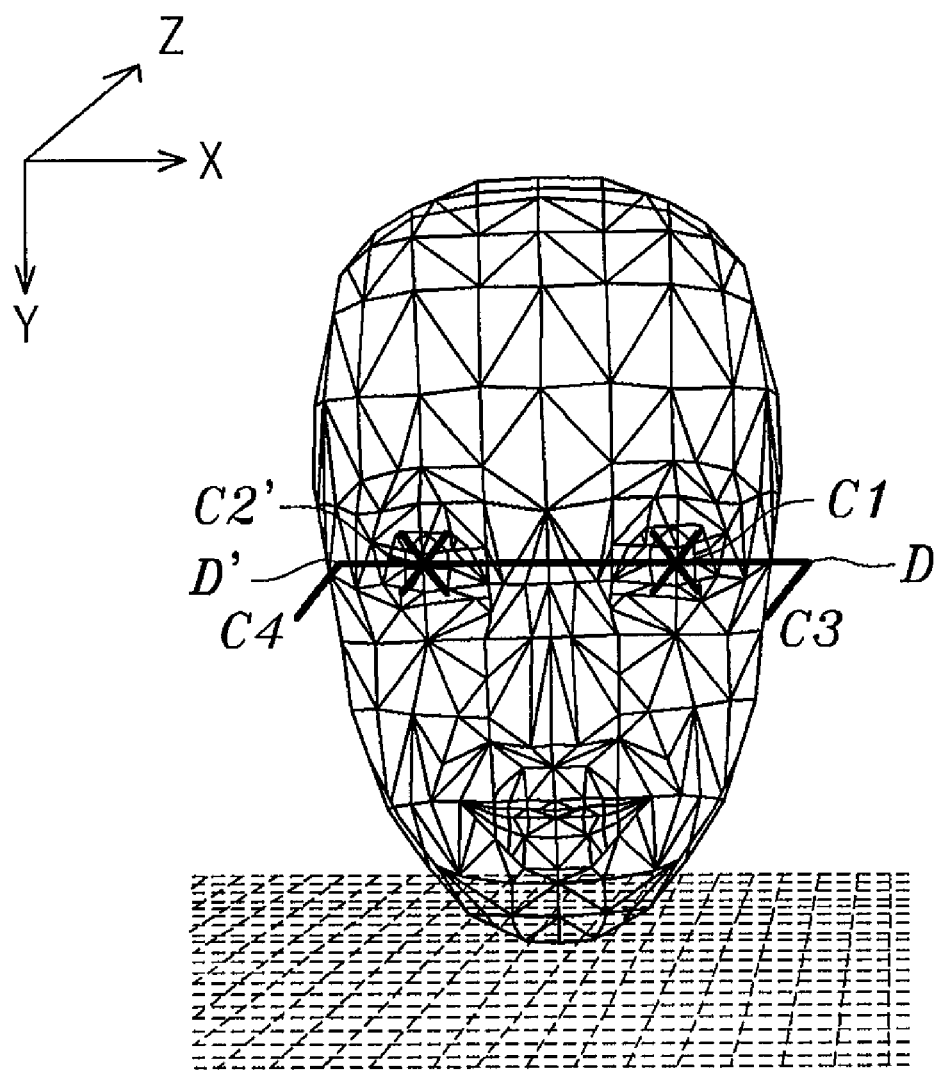
FIG. 17 is a diagram illustrating a process of equalizing a face width of a three-dimensional geometric model of the subject to a face width of a reference three-dimensional geometric model according to an embodiment of the present invention.

FIG. 17 is a diagram illustrating a process of equalizing a face width of a three-dimensional geometric model of the subject to a face width of a reference three-dimensional geometric model according to an embodiment of the present invention.

Referring to FIG. 17, vertical lines are drawn from a straight line connecting the centers of the both pupils in the three-dimensional geometric model of the to the X-Y plane. Then, coordinates of intersection points between the vertical lines and both outermost surfaces of the three-dimensional geometric model are obtained.

That is, $C1$ $(x1, y1, z1)$ is the center point of a left pupil, $C2'(x2, y1, z1)$ is the center point of a right pupils. The outermost points $C3$ $(x3, y1, z3)$ and $C4$ $(x4, y1, z3)$ where the vertical lines from the straight line connecting $C2'$ and $C1$ to the X-Y plane intersect the skin, and points $D$ $(x3, y1, z1)$ and $D'(x4, y1, z1)$ on the X-Y plane thereof are obtained.

The length of the straight line connecting the outermost point $C3$ and $C4$ is the face width (refer Equation 8).

Also, a distance between $D$ and $D'$ may be set as a face width $I$ (refer Equation 9).

$$I=|C4-C3|=|x4-x3| \qquad \text{Equation 8}$$

$$I=|D'-D|=|x4-x3| \qquad \text{Equation 9}$$

The face width $I$ of the subject is compared with the face width $L$ of the reference three-dimensional model to obtain a ratio of the widths.

$$s = \frac{L}{I}, \; C'' = sC'' \qquad \text{Equation 10}$$

where $L$ is the face width of the reference three-dimensional geometric model, $I$ is the face width of the three-dimensional geometric model of the subject, $C'$ is coordinate information of the three-dimensional geometric model of the subject, $C''$ is coordinate information of the size-transformed three-dimensional geometric model of the subject.

In step S260, in order to compare the three-dimensional geometric model of the subject and the reference three-dimensional geometric model, two three-dimensional geometric models are superimposed upon each other on the basis of a common feature point coordinate.

As described above, the feature points include the eyebrow, the eye, the pupil, the nose, and the lip. Two models are superimposed upon each other on the basis of one of the feature points.

Hereinafter, two models are superimposed upon each other on the basis of the center coordinate of the left pupil. This is because the left face is sufficient to reflect the features of the face.

$$C1+T=C1^g$$

$$C'''=C''+T \qquad \text{Equation 11}$$

where $C1$ is the center coordinate of the left pupil in the three-dimensional geometric model of the subject, $C1^g$ is the center coordinate of the left pupil in the reference three-dimensional geometric model. If the coordinate of $C1$ is moved by $T$ to overlap $C1^g$, all coordinates ($C''$) of the three-dimensional geometric model of the subject are transformed by $T$ to obtain the final coordinates ($C'''$) having one overlapped feature point.

In step S270, after the models are aligned on the basis of one of feature points, a sum of Z-axial spatial displacements ZD between two models is calculated.

Figure 18:
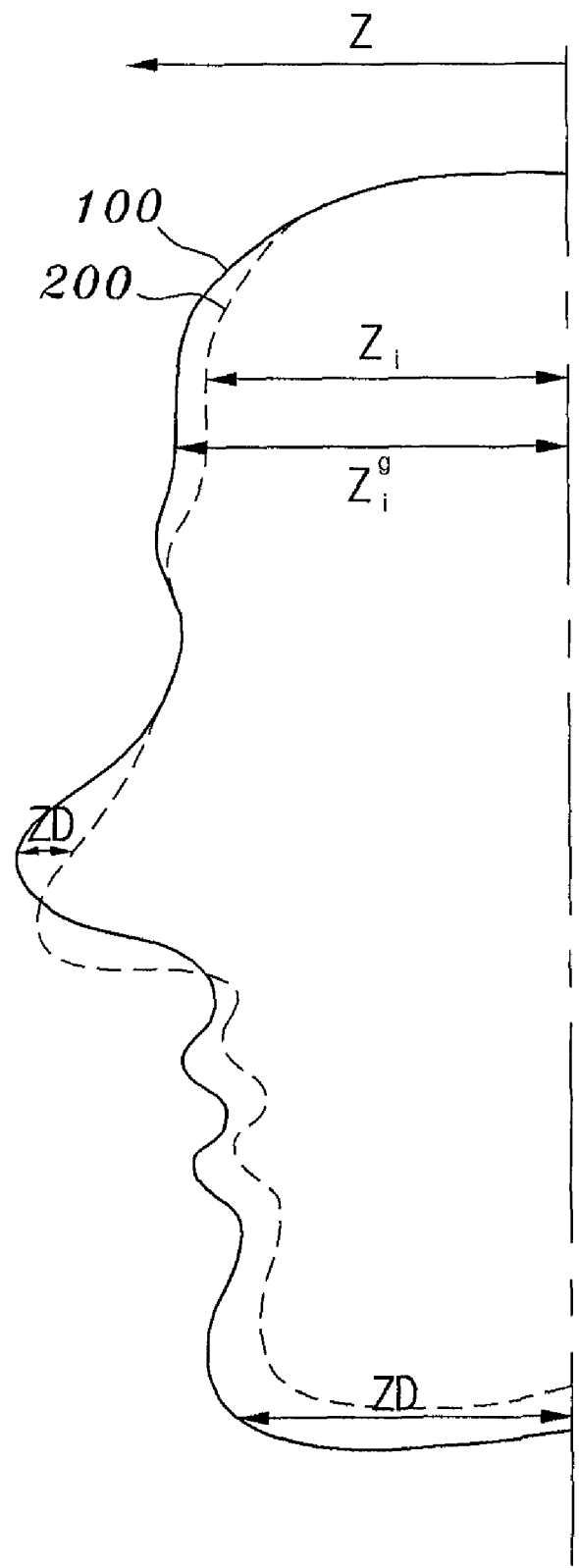
FIG. 18 is a diagram illustrating sections of a three-dimensional geometric model of a subject and a reference three-dimensional geometric model, which overlap each other.

FIG. 18 is a diagram illustrating sections of a three-dimensional geometric model of a subject and a reference three-dimensional geometric model, which overlap each other.

Referring to FIG. 18, spatial displacements ZD between two models may be expressed as the following Equation 12.

$$C'''=(x_i,y_i,z_i)$$

$$ZD=|(0,0,1)E(C'''-C^g)|=|Z_i-Z_i^g| \qquad \text{Equation 12}$$

where, the $C'''$ is a coordinate of the three-dimensional geometric model of the subject 200, $C^g$ is a coordinate of the reference three-dimensional geometric model 100.

There are two methods of obtaining spatial displacements between two models.

The first method includes calculating ZD between two models having coordinates of one or more feature points in the face, and calculating the sum of ZD.

The second method includes obtaining ZD about all X, Y coordinates within a predetermined range, and calculating the sum of the ZD. In this case, the range may is set so as to cover the same or greater range than X, Y coordinates of the three-dimensional geometric model of the subject.

As the three-dimensional geometric model of the subject is more similar to the reference three-dimensional geometric model, the sum of ZD decreases. On the contrary, as the three-dimensional geometric model of the subject is more dissimilar to the reference three-dimensional geometric mode, the sum of ZD increases.

In step S280, the above procedure is performed with respect to all reference three-dimensional geometric models stored in database representing each group. In step S290, a reference three-dimensional geometric model having the smallest sum is detected.

The fact that the sum of ZD is smallest means that the three-dimensional geometric model of the subject is most similar to the reference three-dimensional geometric model.

Accordingly, a group which the reference three-dimensional geometric model showing the smallest sum represents is set as a group where the three-dimensional geometric model of the subject belongs.

As described above, although the three-dimensional model classification method of classifying constitutions according to the embodiments of the present invention has bee described with reference to the accompanying drawings, it will be appreciated that the present invention will not be limited to the embodiments or the drawings set forth in this disclosure, rather can be variously applied within the scope of the present invention.

INDUSTRIAL APPLICABILITY

A three-dimensional model classification method of classifying constitutions according to embodiments of the present invention presents provides a method of comparing three-dimensional geometric models, and enables the constitutions to be automatically classified through an image of the three-dimensional geometric model without direct contact with a patient. Accordingly, the method can be widely applied to the field of medical treatment equipment or data study analysis.

The invention claimed is:

1. A three-dimensional model classification method of classifying constitutions, the method comprising:

correcting color values of a frontal image and one or more profile images to allow a color value of a reference color table in the images to equal a predetermined reference color value, through obtaining the frontal image and one or more profile images of a subject including the reference color table by a camera, the reference color table including one or more sub color regions;

generating a three-dimensional geometric model of the subject by extracting feature point information from the frontal image and the profile image, matching the corresponding feature point information to extract spatial depth information, after removing the reference color table region from the frontal image and the profile image; and classifying a group of the three-dimensional geometric model of the subject by selecting a reference three-dimensional geometric model having a smallest sum of spatial displacements from the three-dimensional geometric model of the subject from a plurality of reference three-dimensional geometric models stored in the database and setting the group which the selected reference three-dimensional geometric model represents as the group where the three-dimensional geometric model of the subject belongs.

2. The three-dimensional model classification method of claim 1, wherein the correcting of the color values comprises the steps of:

1) obtaining the frontal image and one or more profile images of the subject including the reference color table by the camera, the reference color table including one or more sub color regions;
2) detecting the reference color table region and the sub color regions from the frontal image and the profile images obtained in the step 1;
3) calculating a representative color value of each sub color region; and
4) correcting color values of the frontal image and the profile images by a differential degree between the representative color value obtained in the step 3 and the reference color value set for each sub color region.

3. The three-dimensional model classification method of claim 2, wherein the reference color table comprises:

a first reference color table installed at each upper half part of the frontal image and the profile image; and
a second reference color table installed at each lower half part of the frontal image and the profile image.

4. The three-dimensional model classification method of claim 3, wherein the step 4 comprises:

obtaining a first correction matrix transforming the representative color value of each sub color region comprised in the first reference color table region to equal the reference color value for each sub color region;
obtaining a second correction matrix transforming the representative color value of each sub color region comprised in the second reference color table region to equal the reference color value for each sub color region;
obtaining a third correction matrix linearly transforming all pixels comprised in the frontal image and the profile image according to relative distances from a center coordinate of the first reference color table region and a center coordinate of the second reference color table region, by using the first correction matrix and the second correction matrix; and correcting color values of all pixels comprised in the front view and profile images by using the third correction matrix.

5. The three-dimensional model classification method of claim 4, wherein the first correction matrix $T_1$ is expressed as the following Equation:

$$T_1 = CO_1^{-1}$$

where C is a matrix representing the reference color value for each sub color region, and $O_1$ is a matrix representing the color value of the first reference color table region.

6. The three-dimensional model classification method of claim 5, wherein the second correction matrix $T_2$ is expressed as the following Equation:

$$T_2 = CO_2^{-1}$$

where C is a matrix representing the reference color value for each sub color region, and $O_2$ is a matrix representing the color value of the second reference color table region.

7. The three-dimensional model classification method of claim 6, wherein the third correction matrix $(T_3(x,y))$ is expressed as the following Equation:

$$T_3(x,y) = (\sqrt{x^2+y^2} + \sqrt{(W-x)^2+(H-y)^2})C(\sqrt{(W-x)^2+(H-y)^2}O_1 + \sqrt{x^2+y^2}O_2)^{-1}$$

where C is a matrix representing the reference color value for each sub color region, $O_1$ is a matrix representing the color value of the first reference color table region, $O_2$ is a matrix representing the color value of the second reference color table region, W and H are a width and a height from a center position of the first reference color table region to a center position of the second reference color table region, respectively, and x and y are a coordinate of a pixel comprised in the front view and profile images.

8. The three-dimensional model classification method of claim 7, wherein the correcting of the color values of all pixels comprised in the front view and profile images is expressed as the following Equation:

$$P'(x,y) = T_3(x,y)P(x,y)$$

where $P'(x,y)$ is a post-correction color value of a pixel of x,y coordinate, and $P(x,y)$ is a pre-correction color value of a pixel of x,y coordinate.

9. The three-dimensional model classification method of claim 2, wherein the representative color value of each sub color region is a color value of a center coordinate of each sub color region, or an average value of color values of all pixels in each sub color region.

10. The three-dimensional model classification method of claim 1, wherein the generating of the three-dimensional geometric model comprises the steps of:

1) removing the reference color table region from the corrected front view and profile images;
2) forming one three-dimensional texture by extracting coordinates of feature points of regions corresponding to eyes and a mouth from the front view and profile images and by matching the coordinates of the feature points corresponding to each other in the front view and profile images;
3) generating a three-dimensional model by combining a depth information with the coordinates of the feature points, after extracting the spatial depth information by matching the coordinate of the feature point of the frontal image and the coordinate of the feature point of the profile image extracted in the step 2; and 4) mapping the three-dimensional texture generated in the step 2 onto the three-dimensional model generated in the step 3.

11. The three-dimensional model classification method of claim 1, wherein the classifying of the group comprises the steps of:
1) obtaining feature point information comprising an eye, an eyebrow, a pupil, a nose, and a mouth region from the three-dimensional model of the subject;
2) reading a reference three-dimensional geometric model and feature point information thereof representing one of groups stored in the database;
3) aligning faces of the three-dimensional geometric model of the subject and the reference three-dimensional geometric model to be parallel to an X-Y plane;
4) transforming a size of one of two three-dimensional geometric models to allow face widths of the three-dimensional geometric model of the subject and the reference three-dimensional geometric model to equal each other;
5) aligning the three-dimensional geometric model of the subject and the reference three-dimensional geometric model to overlap each other on a basis of one of the feature point coordinates;
6) obtaining a sum of Z-axial spatial displacements between the three-dimensional geometric model of the subject and the reference three-dimensional geometric model; and
7) setting a group of the reference three-dimensional geometric models having a smallest sum of the spatial displacements as a group of the three-dimensional geometric model of the subject, after repeatedly performing the steps 2 to 6 with respect to all groups of the reference three-dimensional geometric models stored in the database.

12. The three-dimensional model classification method of claim 11, wherein the database comprises the reference three-dimensional geometric model and the feature point information representing each group generated by averaging collected data for each group, after collecting the three-dimensional geometric model of multiple subjects having constitution corresponding to each group.

13. The three-dimensional model classification method of claim 11, wherein the step 3 comprises:
rotationally transforming the two three-dimensional geometric models to allow a plane connecting three points in the three-dimensional geometric model of the subject or the reference three-dimensional geometric model to be parallel to the X-Y plane, the three points comprising center coordinates of both pupils and a center coordinate of a mouth; and
rotationally transforming the two three-dimensional geometric models to allow a straight line connecting the center coordinates of the both pupils to be parallel to an X-axis, the two three-dimensional geometric models rotated about a Z-axis.

14. The three-dimensional model classification method of claim 13, wherein the step 3 further comprises transforming the feature point information using the rotational transforming of the two three-dimensional geometric models.

15. The three-dimensional model classification method of claim 11, wherein the step 4 comprises:
obtaining two coordinates of intersecting locations between both outermost surfaces of the three-dimensional geometric model and a vertical line from the straight line connecting the centers of the both pupils in the three-dimensional geometric model of the subject to the X-Y plane;
obtaining two coordinates of intersecting locations between both outermost surfaces of the reference three-dimensional geometric model and a vertical line from the straight line connecting the centers of the both pupils in the three-dimensional geometric model of the subject to the X-Y plane;
calculating a ratio of a size transformation by comparing a face width of the subject and a face width of a reference subject, the face widths being lengths between the two coordinates, respectively; and
transforming a size of one of the three-dimensional geometric model of the subject and the reference three-dimensional geometric model to allow the face widths to equal each other by using the ratio of the size transformation.

16. The three-dimensional model classification method of claim 15, wherein the step 4 further comprises transforming the feature point information of one of the three-dimensional geometric model of the subject and the reference three-dimensional geometric model by using the ratio of the size transformation.

17. The three-dimensional model classification method of claim 11, wherein the step 5 comprises moving the two three-dimensional geometric models to allow center coordinates of left pupils of the three-dimensional geometric model of the subject and the reference three-dimensional geometric model to equal each other.

18. The three-dimensional model classification method of claim 17, wherein the step 5 further comprises moving the feature point information of the two three-dimensional geometric models to allow the center coordinates of the left pupils of the three-dimensional geometric model of the subject and the reference three-dimensional geometric model to equal each other.

19. The three-dimensional model classification method of claim 11, wherein the step 6 comprises obtaining the sum by calculating Z-axial spatial displacements with respect to one or more feature point coordinates.

20. The three-dimensional model classification method of claim 11, wherein the step 6 comprises obtaining the sum by calculating Z-axial spatial displacements with respect to all X, Y coordinates within a predetermined range.

* * * * *